(12) United States Patent
Gangwal et al.

(10) Patent No.: US 8,331,711 B2
(45) Date of Patent: *Dec. 11, 2012

(54) IMAGE ENHANCEMENT

(75) Inventors: Om Prakash Gangwal, Eindhoven (NL); Eric Peter Funke, Eindhoven (NL); Christiaan Varekamp, Eindhoven (NL); Mickael Stephane Bernard George Bouvier, Orvault (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 922 days.

This patent is subject to a terminal disclaimer.

(21) Appl. No.: 12/443,728

(22) PCT Filed: Oct. 2, 2007

(86) PCT No.: PCT/IB2007/053995
§ 371 (c)(1),
(2), (4) Date: Mar. 31, 2009

(87) PCT Pub. No.: WO2008/041178
PCT Pub. Date: Apr. 10, 2008

(65) Prior Publication Data
US 2010/0002948 A1     Jan. 7, 2010

(30) Foreign Application Priority Data
Oct. 4, 2006  (EP) ..................... 06301011

(51) Int. Cl.
*G06K 9/40* (2006.01)
*G06K 15/02* (2006.01)
(52) U.S. Cl. ......................... 382/254; 358/1.2
(58) Field of Classification Search .................. 382/162, 382/254, 264, 274–275, 298, 299, 305, 312; 358/1.2, 528, 3.27; 345/422, 582, 589, 660, 345/670

See application file for complete search history.

(56) References Cited

U.S. PATENT DOCUMENTS
6,869,750 B2 * 3/2005 Zhang et al. .................. 430/312
(Continued)

FOREIGN PATENT DOCUMENTS
EP          0971315 A2    1/2000
(Continued)

OTHER PUBLICATIONS
Gonzalez R.C. et al "Digital Image Processing Passage" pp. 187, 194-201.
(Continued)

*Primary Examiner* — Kanjibhai Patel

(57) ABSTRACT

The present invention relates to an image enhancement unit and a method of enhancing a first structure (S1) of samples into a second structure (S2) of samples, the first and the second structure both representing a first property of a scene and having a first resolution, based on a third structure (S3) of samples representing a second property and having the first resolution, the first property and the second property respectively representing different properties of substantially the same scene. The method comprising generating a fourth structure (S4) of samples representing the first property, the fourth structure (S4) of samples having a second resolution lower than the first resolution, by down-scaling first samples of the first structure (S1) of samples to form the samples of the fourth structure (S4) of samples. The method further comprising up-scaling the fourth structure (S4) of samples representing the first property, into the second structure (S2) based on the third structure (S3) of samples, the up-scaling comprising assigning weight factors to respective samples of the fourth structure (S4) of samples based on samples of the third structure (S3) of samples; and computing samples of the second structure (S2) of samples using the samples of the fourth structure (S4) of samples and their respectively assigned weight factors. The invention further relates to an image-processing unit comprising an image enhancement unit according to the invention as well as to a computer program product.

19 Claims, 12 Drawing Sheets

U.S. PATENT DOCUMENTS

| | | | |
|---|---|---|---|
| 6,885,801 B1 * | 4/2005 | Shankar et al. | 385/117 |
| 7,376,688 B1 * | 5/2008 | von der Embse | 708/300 |
| 7,876,323 B2 * | 1/2011 | Kondo | 345/428 |
| 2003/0053600 A1 | 3/2003 | Schmitz | |

FOREIGN PATENT DOCUMENTS

| | | |
|---|---|---|
| EP | 1111906 A2 | 6/2001 |
| WO | 2005013623 A1 | 2/2005 |
| WO | 2005083630 A2 | 9/2005 |

OTHER PUBLICATIONS

Askar, Serap et al "Fast Adaptive Upscaling of Low Structured Images using a Hierarchical Filling Strategy".

Atspadin, Nicole et al "New Concept for Joint Disparity Estimation and Segmentation for Real-Time Video Processing".

Paris, Sylvain et al "A Fast Approximation of the Bilateral Filter using a Signal Processing Approach" MA Institute of Technology.

Redert, Andre et al "Synthesis of Multi Viewpoint Images at Non-Intermediate Positions" Proceedings of International Conf. on Acoustics, Speech, and Signal Processing. vol. IV, ISBN 0-8186-7919-0, pp. 2749-2752, 1997.

Berretty, R.P. et al "High Quality Images from 2.5D Video" Eurographics 2003, Short Presentations.

* cited by examiner

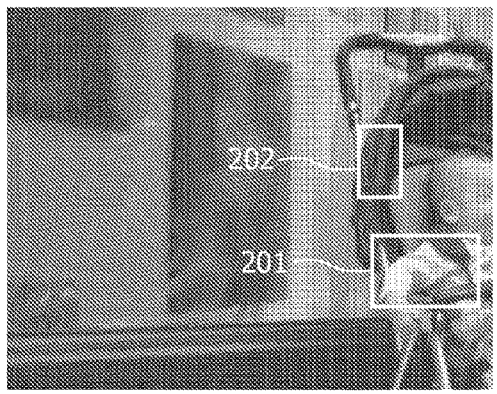
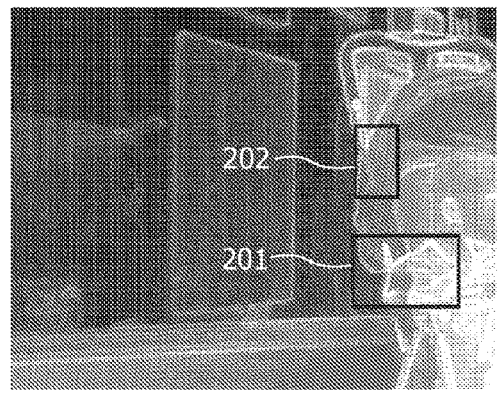
FIG. 1A    FIG. 1B
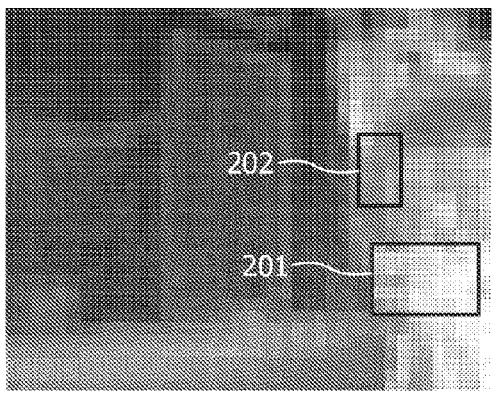
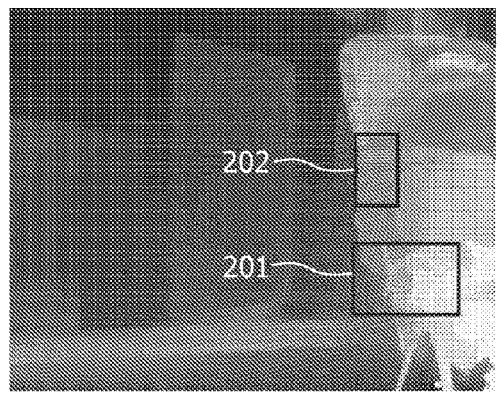
FIG. 1C    FIG. 1D

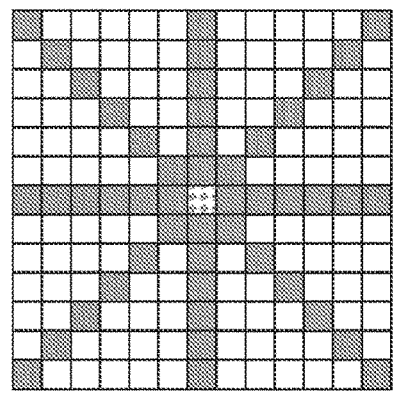
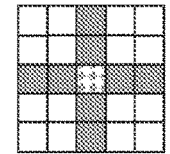
FIG. 4A            FIG. 4B
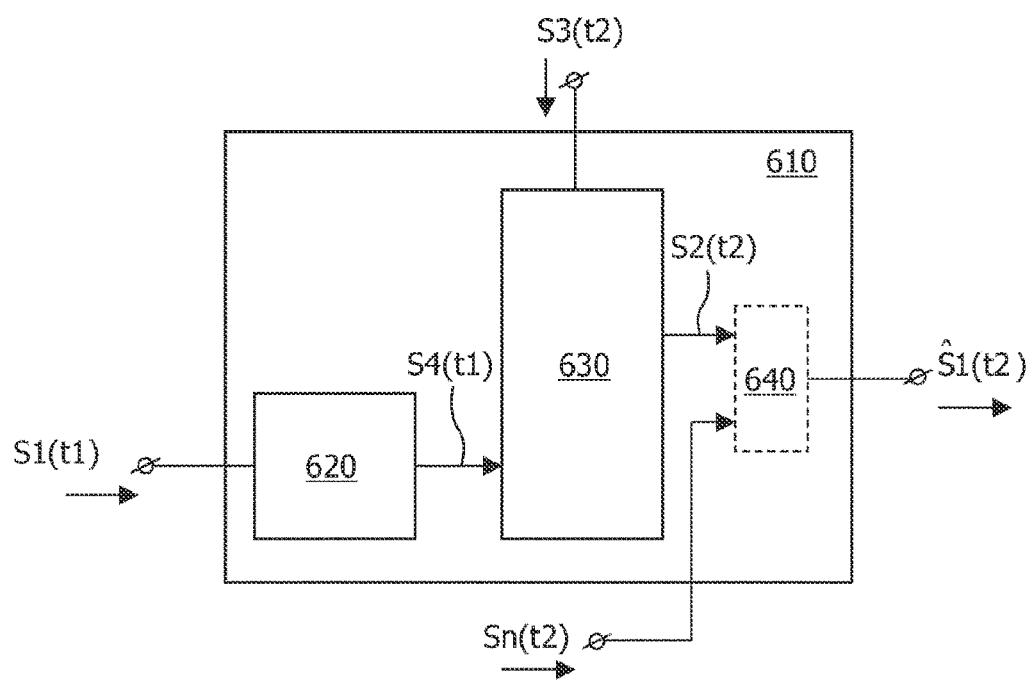
FIG. 5A

IMAGE ENHANCEMENT

FIELD OF THE INVENTION

The invention relates to a method of enhancing a first structure of samples into a second structure of samples, the first and the second structure both representing a first property of a scene and having a first resolution.

The invention further relates to an image enhancement unit for enhancing a first structure of samples into a second structure of samples, the first and the second structure both representing a first property and both having a first resolution. The invention further relates to an image-processing apparatus comprising such an image enhancement unit.

The invention further relates to a computer program product comprising program code means stored on a computer readable medium, said program code means being arranged to execute the steps of the above method when said program code means is run on a computer.

BACKGROUND OF THE INVENTION

The generation of motion vector fields and disparity maps from motion video has long since attracted the attention of academics as well as the consumer electronics industry. The interest in motion vector generation received a substantial boost from the use of motion estimation and compensation techniques in video compression.

The pending introduction of 3D television and/or multi-view rendering equipment has similarly increased the interest in depth map and disparity map generation. Disparity maps and depth maps are commonly used in multi-view image generation from a single sequence of video images and enable the conversion of 2D video content into a format suitable for 3D television and/or multi-view rendering equipment.

Motion estimation can be used as a starting point for depth estimation. Estimation methods for motion vector fields often rely on the determination of similar image parts of consecutive images. As a single pixel value is insufficiently discernible to establish similarity, typically a group of pixels is used for establishing correspondence between image parts of consecutive images. As a result, the motion vector fields resulting from such estimation methods generally have a lower resolution than the original images. Some techniques for calculating motion vector fields calculate motion vectors for 8×8 pixel grids. As a result, when such a motion vector field is used for calculating a depth map the resolution will generally be too coarse for high quality rendering and will generally result in visible artifacts visible as halos at object edges.

Other techniques for depth map generation such as presented in WO2005/013623 "Multi-view Image Generation", provide a full resolution depth map estimate at relatively low computational cost. First edges are established within an image and based thereon a depth map is generated by assigning respective depth map values to respective sides of the edge. Although the resolution of such depth maps is substantially higher than that of block based depth maps, the quality of the resulting depth maps can be further improved.

SUMMARY OF THE INVENTION

It is an object of the invention to provide a method of enhancing a first structure of samples representative of a first property that, on average, produces an enhanced structure of samples.

The object of the invention is achieved by the method according to claim 1. The method according to claim 1 enhances the first structure of samples resulting in a second structure of samples. The first and the second structure both represent the first property (e.g. depth) and the first and the second structure both have a first resolution. The first structure is enhanced based on a third structure of samples representing a second property (e.g. color) having the first resolution. The first property and the second property respectively represent different properties of substantially the same scene.

The first structure of samples can be seen as an input structure, the second structure of samples represents an output structure. The samples of both first and second structure represent samples of one and the same property of the scene, such as a depth map, a disparity map, or a motion vector field. The third structure of samples can be seen as a reference structure that is used to generate the second structure of samples. The reference structure represents a different property, such as luminance, color, or texture of a scene. The first, the second, and the third structure all have the same resolution.

In order to enhance the first structure of samples, samples of a fourth structure of samples are generated representing the first property by down-scaling samples of the first structure of samples to form the samples of the fourth structure of samples. The fourth structure of samples can be seen as an intermediate structure resulting from downscaling the first structure. By down-scaling the first structure, several samples of the first structure of samples will contribute to the respective samples of the fourth structure of samples. As a result, the quality of the estimate as represented by the respective samples of the fourth structure can, on average, be expected to be higher than those of the individual samples of the first structure as noise in individual pixels is factored out. This gain in quality comes at the cost of a reduction in spatial resolution.

By using a known structure in the form of the third structure, at the first resolution that provides accurate information with respect to object boundaries, the higher quality samples of the fourth structure can be up-scaled in an image adaptive manner using the finer detail from the third structure. As a result, finer detail is re-introduced using the, on average, higher quality samples of the fourth structure resulting in an, on average, improved estimate of the first property at the first resolution. In addition, this approach also removes more subtle textures present inside objects. As a result, objects defined by an edge typically have a more uniform filling.

Typically, a structure of samples corresponds to a matrix of data elements. However, the structures of samples may correspond to alternative configurations of data elements.

Further objects of the invention are to provide an image enhancement unit, an image-processing apparatus, and a computer program product of the kind described in the opening paragraph, which provide an image enhancement.

These objects of the invention are achieved by the image-enhancement unit, the image-processing apparatus and the computer program product respectively as claimed in claims 16, 17 and 18, respectively.

In a preferred embodiment the weight factors assigned to respective samples of the fourth structure of samples are based on differences between samples of the third structure of samples and low-pass filtered samples of the third structure of samples. The differences between respective samples of the third structure and respective low-pass filtered samples of the third structure provide an indication of how samples of the second property at a lower spatial resolution relate to those at the first resolution.

More preferably, the low-pass filtering comprises down-scaling of the samples of the third structure from the first resolution to the second resolution. As a result, the more reliable estimates of the first property as stored in the fourth structure of samples are up-scaled based on structural information from the second structure of samples representing the second property, thereby allowing the up-scaling to substantially adopt the object boundaries as found in the third structure of samples.

Even more preferably, a fifth structure of samples representing the second property is generated, the fifth structure having the second resolution. The fifth structure is formed by down-scaling the samples of the third structure of samples to form the samples of the fifth structure of samples. The weight factors assigned to the respective samples of the fourth structure of samples are based on differences between samples of the fifth structure of samples and the samples of the third structure of samples. The differences between respective samples of the third structure and samples of the fifth structure provide a more reliable indication as to how samples of the second property at the second resolution relate to those at the first resolution.

In a further embodiment the first structure of samples represents the first property of the scene at a first timestamp and the third structure of samples represents the second property of the scene at a second timestamp, wherein the second timestamp is proximate in time to the first timestamp, such that the first structure of samples forms an estimate of a further structure of samples representing the first property at the second timestamp. The present embodiment enables e.g. the use of a previous (or future) depth map as an estimate for generating the present depth map. By first down-scaling the first structure resulting in a fourth structure, and calculating weight factors for the samples of the fourth structure rather than for samples of the first structure, the number of computations required to predict the present depth map can be reduced.

Modifications of the image-enhancement unit and variations thereof may correspond to modifications and variations of the image-processing apparatus, the method and the computer program product described hereinafter.

BRIEF DESCRIPTION OF THE DRAWINGS

These and other properties of the image-enhancement unit, the image-processing apparatus, the method and the computer program product according to the invention will become apparent from and will be elucidated with respect to the implementations and embodiments described hereinafter and with reference to the accompanying drawings, wherein:

FIG. 1A shows a luminance image at full resolution;

FIG. 1B shows an estimated depth map at full resolution;

FIG. 1C shows a down-scaled version of the estimated depth map at lower resolution;

FIG. 1D shows an enhanced depth map generated according to the present invention using the images 1A and 1C;

FIG. 4A schematically shows a first filter aperture;

FIG. 4B schematically shows a second filter aperture;

FIG. 5A schematically shows an embodiment of the present invention for enhancing an estimated depth map, disparity map, or motion vector field;

Like reference numerals are used to denote similar parts throughout the Figures.

DETAILED DESCRIPTION OF THE EMBODIMENTS

Figure 2A:
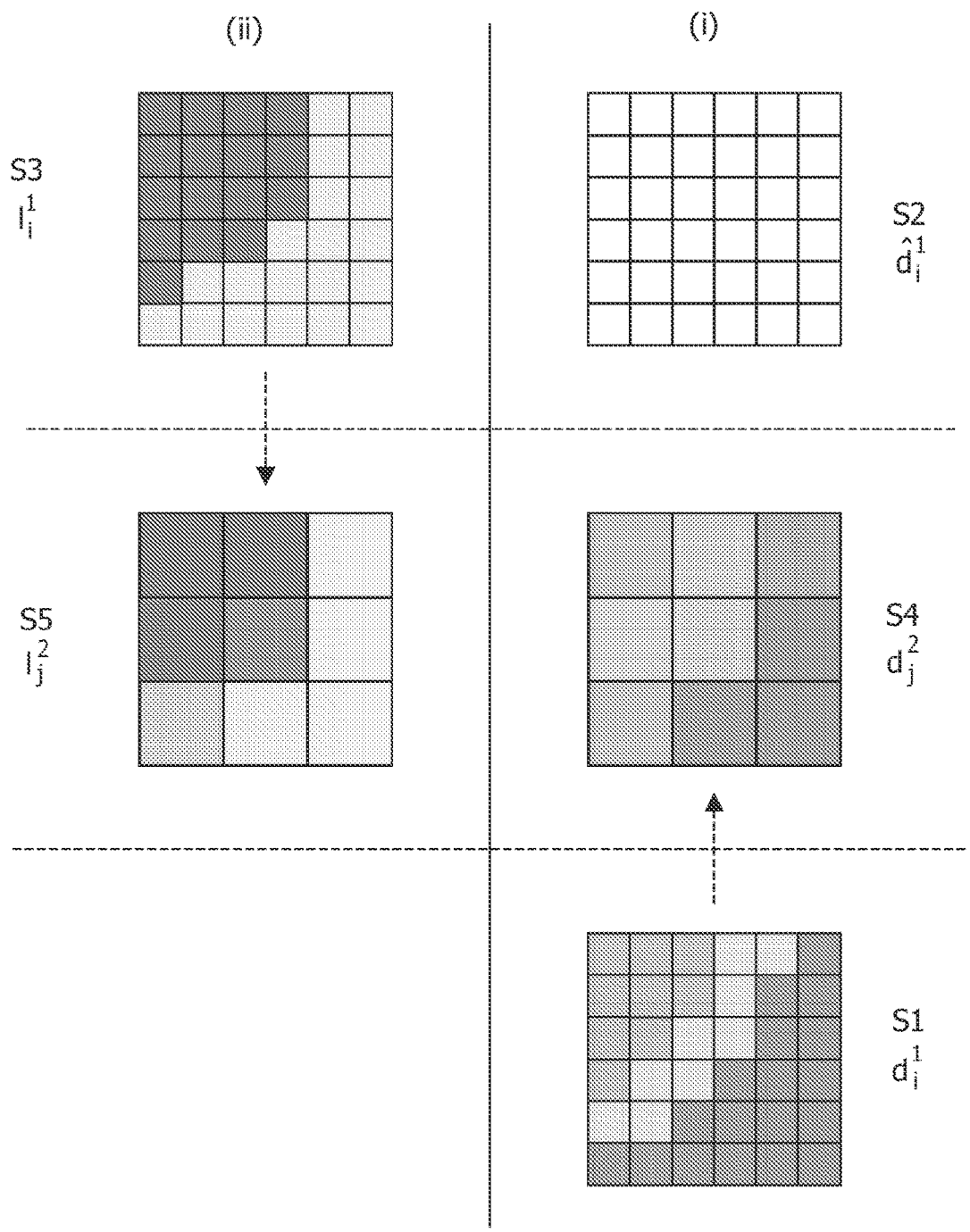
FIG. 2A schematically shows five structures of samples, whereby the values of the second structure of samples have not been computed yet.

The potential for image enhancement tangibly embodied in the present invention is best illustrated using a series of images. FIG. 1A shows a luminance image at full resolution. FIG. 1B shows an estimated depth map at the same resolution. Objects closer to the viewer show a high brightness, whereas objects further away are darker. Within region 201 a variety of edges are highlighted within which depth map values are comprised, a depth map similar to that shown in FIG. 1B can be generated using the methods according to WO2005/013623 entitled "Multi-view Image Generation" and WO2005/083630 entitled "Creating a depth map". Region 202 shows several more subtle edges that represent structure within an object, but as such are part of one and the same object. From this image it will be clear that during estimation edges were introduced as well as more subtle variations in depth that do not correctly reflect the actual depth.

The depth estimate as shown in FIG. 1B is down-scaled here using a down-scaling factor of 8. FIG. 1C represents the downscaled image, the down-scaled image here is shown extended using sample duplication resulting in an image with dimensions identical to the others. Subsequently, the down-scaled depth map estimate is up-scaled in an image-adaptive manner using the luminance information from FIG. 1A resulting in FIG. 1D. The edges within the regions 201 and 202 have been substantially removed, and the depth values located within respective objects have been substantially propagated throughout the objects. The resulting depth map as depicted in FIG. 1D clearly provides an improvement over that depicted in FIG. 1B.

Although the down-scaling factor of 8 is particularly advantageous, improvements can be seen when using down-scaling factors in the range from 2 to 16. Depending on original resolution and the desired granularity of the resulting depth map higher down-scaling factors can be used, at the cost of a further loss of detail.

In connection with FIG. 2A to FIG. 2F an embodiment of the method according to the invention will be described. FIG. 2A to FIG. 2F schematically show:

a first structure S1 of samples representing a first property; the first structure having a first resolution;

a second structure S2 of samples representing the first property; the second structure S2 of samples having the first resolution;

a third structure S3 of samples representing a second property; the third structure S3 of samples having the first resolution;

a fourth structure S4 of samples representing the first property; the fourth structure S4 of samples having a second resolution, the second resolution being lower than the first resolution; and a fifth structure S5 of samples representing the second property; the fifth structure S5 of samples having the second resolution.

The method according to the invention aims at enhancing the first structure S1 of samples, resulting in the second structure S2 of samples by:

generating fourth samples of the fourth structure S4 of samples by down-scaling first samples of the first structure S1 of samples to form fourth samples of the fourth structure S4 of samples;

generating fifth samples of the fifth structure S5 of samples by down-scaling third samples of the third structure S3 of samples to form fifth samples of the fifth structure S5 of samples;

up-scaling the fourth structure S4 of samples into the second structure S2 of samples; based on the third structure S3 of samples and the fifth structure S5 of samples. The up-scaling comprising:

i) assigning weight factors to respective first samples of the fourth structure S4 of samples based on differences between respective third samples of the third structure S3 of samples and fifth samples of the fifth structure S5 of samples; and ii) computing the second samples of the second structure S2 of samples based on the fourth samples of the fourth structure S4 of samples and the respective assigned weight factors.

FIG. 2A schematically shows five structures S1-S5 of samples, whereby the values of the second structure S2 of samples have not been computed yet. This can be seen as the situation after down-scaling of the first and third structures of samples.

Typically the fourth samples of the fourth structure S4 are computed based on the first samples of the first structure S1 of samples. In other words, the structure S4 of samples is computed by low-pass filtering the first structure S1 of samples, i.e. through down-scaling. The fourth samples of the fourth structure S4 can be generated using e.g. a $\sin(x)/x$ filter, or a box averaging filter, followed by down-sampling. Furthermore, this down-scaling filter may be applied to only a subset of the first samples of the first structure S1 of samples.

Typically, the fifth samples of the fifth structure S5 of samples are computed based on the third samples of the third structure S3 of samples. In other words, the structure S5 of samples is computed by low-pass filtering the fifth structure S5 of samples. The fifth samples of the fifth structure S5 can be generated using e.g. a $\sin(x)/x$ filter, or a box averaging filter, followed by down-sampling. Furthermore, this down-scaling filter may be applied on only a subset of the third samples of the third structure S3 of samples.

Although the entire fourth structure S4 and fifth structure S5 are pre-computed here for the sake of clarity, the fourth and fifth samples can be calculated on-the-fly when respective fourth and fifth samples are needed. As a result, the storage requirements can be reduced at the cost of potential duplication of calculations.

The first property may correspond to depth-values, disparity-values, or motion vectors. Accordingly, the fourth structure S4 of samples may correspond to an estimated, synthesized, depth map, disparity map, or motion vector field. Alternatively, the fourth structure S4 of samples may correspond to a portion depth map thereof.

The second property may correspond to luminance, color, and/or color texture. The third structure S3 of samples typically corresponds to a high resolution luminance/color image. Alternatively, the third structure S3 of samples corresponds to a portion of a relatively high-resolution luminance/color image. The fifth structure S5 of samples may correspond to a relatively low-resolution luminance/color image. This means a lower resolution than that of the third structure S3. Alternatively, the fifth structure S5 of samples corresponds to a portion of a relatively low-resolution luminance/color image.

The different gray values in the FIGS. 2A-2F represent different values of the first property and the second property, such as luminance/color and depth values/motion vectors, respectively.

Figure 2B:
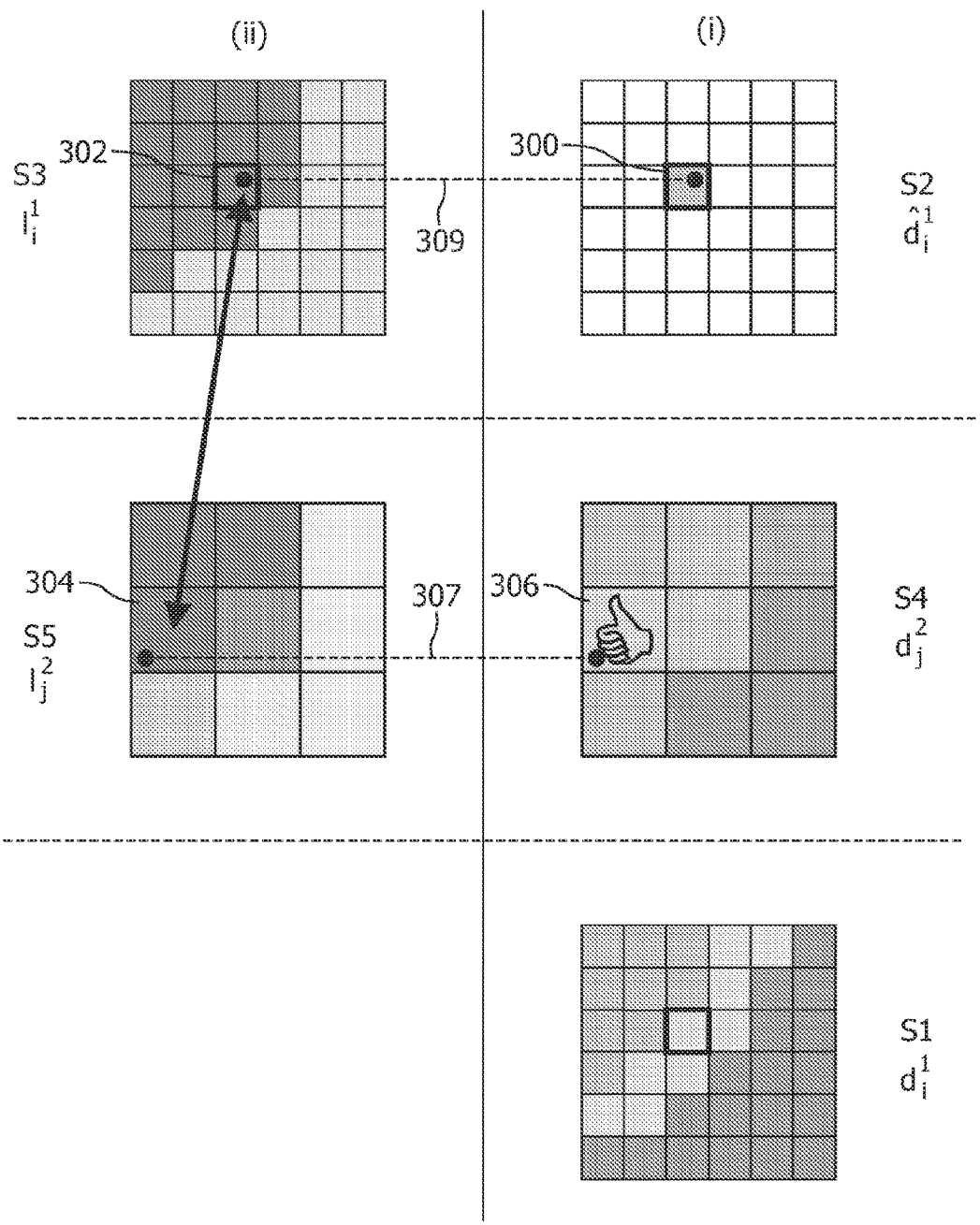
FIG. 2B schematically shows an assignment of a first weight factor based on a first difference, to be applied for the computation of a first output sample.

FIG. 2B schematically shows an assignment of a first one of the weight factors of a first one of the fourth samples 306 based on a first difference, the first one of the weight factors to be applied for the computation of a first output sample 300. The first output sample 300 corresponds to one of the second samples of the second structure S2 of samples.

The assignment of a first one of the weight factors of a first one of the fourth samples 306, is based on a first difference between a first one of the third samples 302 and a first one of the fifth samples 304. Preferably, the following relations between the different samples apply:

the respective coordinates of the first one of the fourth samples 306 and the first one of the fifth samples 304 are mutually equal. The correspondence between respective coordinates is indicated by the dashed line with reference number 307 between the first one of the fourth samples 306 and the first one of the fifth samples 304; and the respective coordinates of the first one of the third samples 302 and the first one of the second samples 300 are mutually equal. The correspondence between respective coordinates is indicated by the dashed line with reference number 309 between the first one of the third samples 302 and the first one of the second samples 300.

Because the first difference between the first one of the fifth samples 304 and the first one of the third samples 302 is relatively low, the first one of the weight factors is relatively high. This is indicated in FIG. 2B with the "thumbs up sign" for the first one of the fourth samples 306.

Figure 2C:
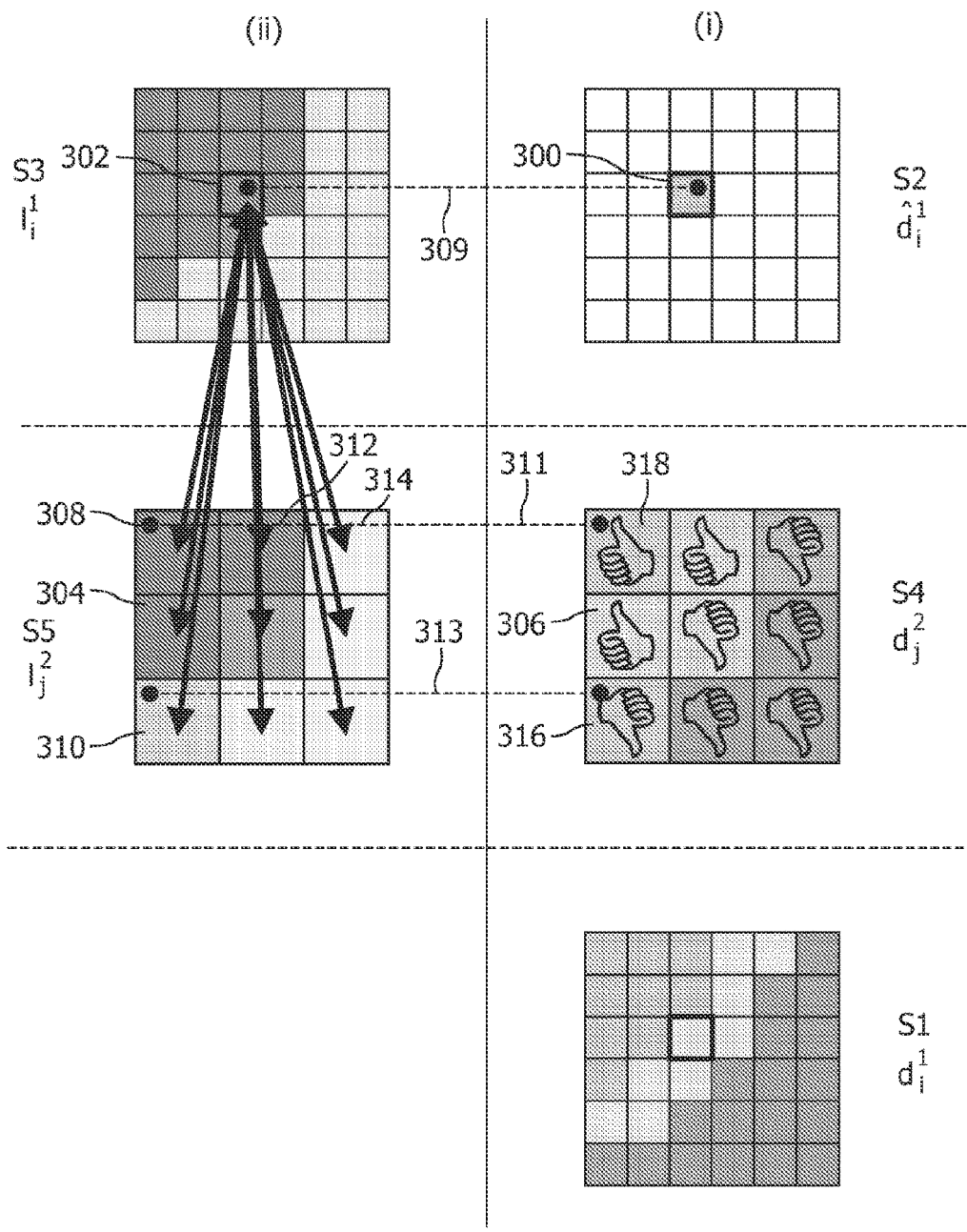
FIG. 2C schematically shows the assignment of a number of weight factors based on respective differences.

The assignment of further weight factors of further first samples is schematically indicated in FIG. 2C. For example, the assignment of a second one of the weight factors of a second one of the fourth samples 318, is based on a second difference between a second one of the fifth samples 308 and the first one of the third samples 302. The respective coordinates of the second one of the first samples 318 and the second one of the fifth samples 308 are mutually equal. The correspondence between the respective coordinates is indicated by the dashed line with reference number 311. Because the second difference between the second one of the fifth samples 308 and the first one of the third samples 302 is relatively low, the second one of the weight factors is relatively high. This is indicated in FIG. 2C with the "thumbs up sign" for the second one of the fourth samples 318.

The assignment of a third one of the weight factors of a third one of the fourth samples 316, is based on a third difference between a third one of the fifth samples 310 and the first one of the third samples 302. The respective coordinates of the third one of the fourth samples 316 and the third one of the fifth samples 310 are mutually equal. The correspondence between the respective coordinates is indicated by the dashed line with reference number 313. Because the third difference between the third one of the fifth samples 310 and the first one of the third samples 302 is relatively high, the third one of the weight factors is relatively low. This is indicated in FIG. 2C with the "thumbs down sign" for the third one of the fourth samples 316.

After having assigned the weight factors, the second samples of the second structure S2 of samples can be computed based on the fourth samples of the fourth structure S4 of samples and the respective assigned weight factors.

Next the computation of the second samples of the second structure S2 will be described mathematically. Suppose that the fourth property corresponds to depth and that the fourth samples are denoted by $d_j^2$, whereby d represents depth, the superscript 2 refers to the second resolution and the subscript j corresponds to an index in the fourth structure of samples. The second samples are denoted by $\hat{d}_i^1$, whereby d represents depth, the superscript 1 refers to the first resolution and the subscript i corresponds to an index in the second structure of samples. In order to calculate an estimated depth value $\hat{d}_i^1$, surrounding depth values $d_j^2$ are used. Preferably, a weighted average filter is used:

$$\hat{d}_i^1 = \frac{\sum_j w_{ij} d_j^2}{\sum_j w_{ij}} \qquad (1)$$

This equation is used to compute depth values $\hat{d}_i^1$, i.e. the values of the second samples of the second sample structure S2. For every depth value $\hat{d}_i^1$, j surrounding depth values $d_j^2$ are used. The weight factors $w_{ij}$ are determined based on differences between values corresponding to the second property. For example, the second property corresponds to luminance. This means that luminance value $l_j^2$ of the fifth structure S5 is compared to the luminance value of the third structure S3, $l_i^1$. Preferably the following exponential function is used for the computation of the weight factors:

$$w_{ij} = 2^{-\alpha(|l_j^2 - l_i^1|)} \qquad (2)$$

Where α typically has a value of ⅛.

In the case of RGB (Red, Green, Blue) data, i.e. the second property corresponding to color, each color component can contribute to the weight factors $$w_{ij} = 2^{-\alpha(|r_j^2 - r_i^1| + |g_j^2 - g_i^1| + |b_j^2 - b_i^1|)} \qquad (3)$$

In the case of YUV data, the contribution of U and V data is less significant than the contribution of the luminance data l, a corresponding to Y:

$$w_{ij} = 2^{-\alpha(|l_j^2 - l_i^1| + \frac{1}{2}|u_j^2 - u_i^1| + \frac{1}{2}|v_j^2 - v_i^1|)} \qquad (4)$$

Apart from color differences, other image properties can show differences in the image contents. The inventors observed that addition of a simple texture measure also improves the results. The texture $t_j^2$ is defined as the absolute difference between the maximum and the minimum luminance value in a group of samples. Then the weight factors can be defined as:

$$w_{ij} = 2^{-\alpha(|l_j^2 - l_i^1| + |t_j^2 - t_i^1|)} \qquad (5)$$

It will be clear that all samples of the second structure S2 of samples have to be computed. After computation of the first one 300 of the second samples of the second sample structure S2, the second one 322 of the second samples of the second sample structure S2 will be computed. Again, this is based on assigning weight factors followed by filtering based on the assigned weight factors.

Figure 2D:
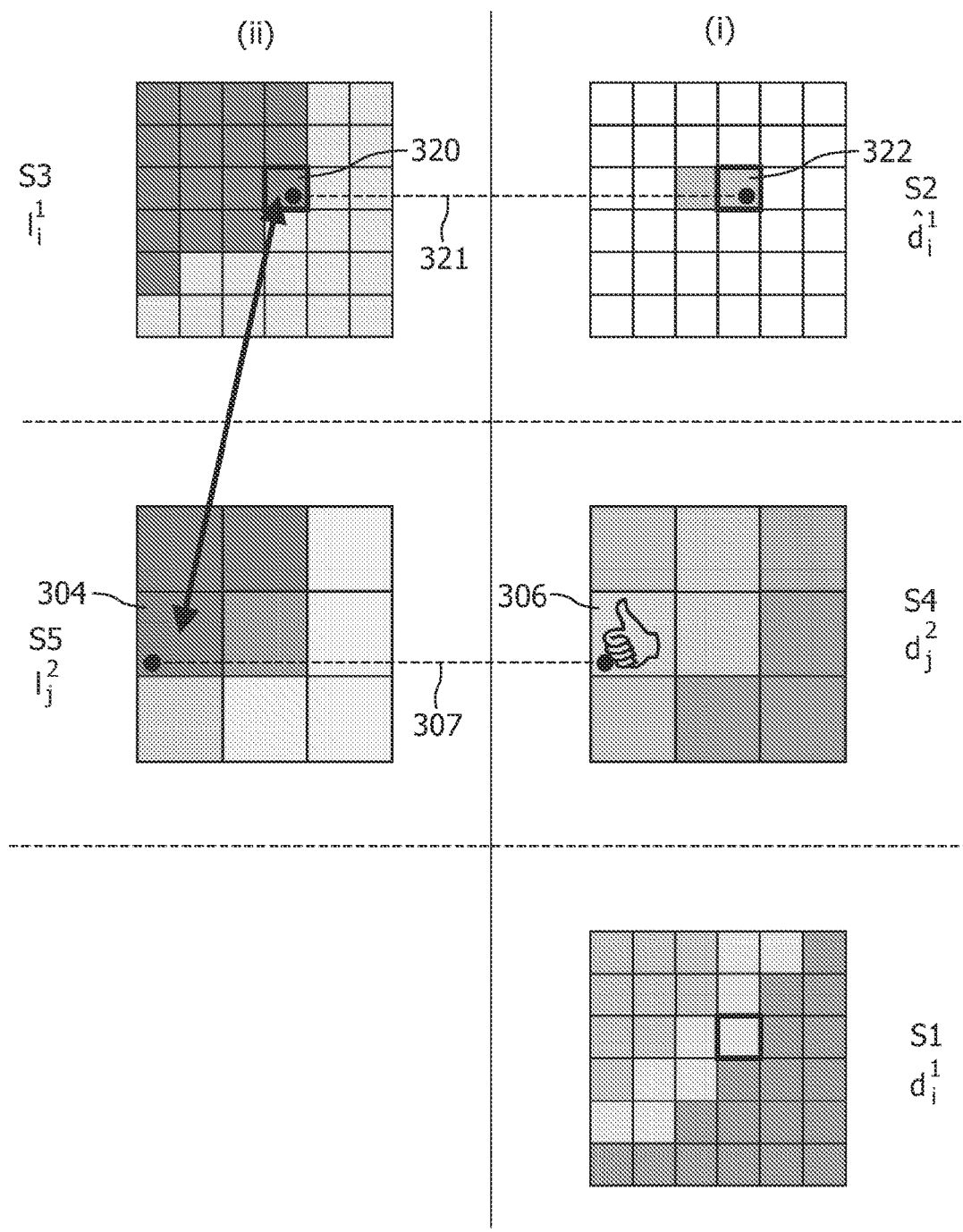
FIG. 2D schematically shows an assignment of a first weight factor, based on a first difference, to be applied for the computation of a second output sample.

FIG. 2D schematically shows the assignment of a further weight factor based on a further difference, to be applied for the computation of the second output sample, i.e. the second one 322 of the second samples of the second structure S2 of samples.

The assignment of the further one of the weight factors of the first one of the fourth samples 306 is based on a further difference between the first one of the fifth samples 304 and a second one of the third samples 320. Preferably, the following relations between the different samples apply:

the respective coordinates of the first one of the fourth samples 306 and the first one of the fifth samples 304 are mutually equal. The correspondence between respective coordinates is indicated by the dashed line with reference number 307 between the first one of the fourth samples 306 and the first one of the fifth samples 304; and the respective coordinates of the second one of the third samples 320 and the second one of the second samples 322 are mutually equal. The correspondence between respective coordinates is indicated by the dashed line with reference number 321 between the second one of the third samples 320 and the second one of the second samples 322.

Because the further difference between the first one of the fifth samples 304 and the second one of the third samples 320 is relatively low, the further one of the weight factors is relatively high. This is indicated in FIG. 2D with the "thumbs up sign" for the first one of the first samples 306.

Similar to the facts disclosed above in connection with FIG. 2C, subsequent weight factors for the computation of the second one 322 of the second samples of the second sample structure S2 will be computed.

Figure 2E:
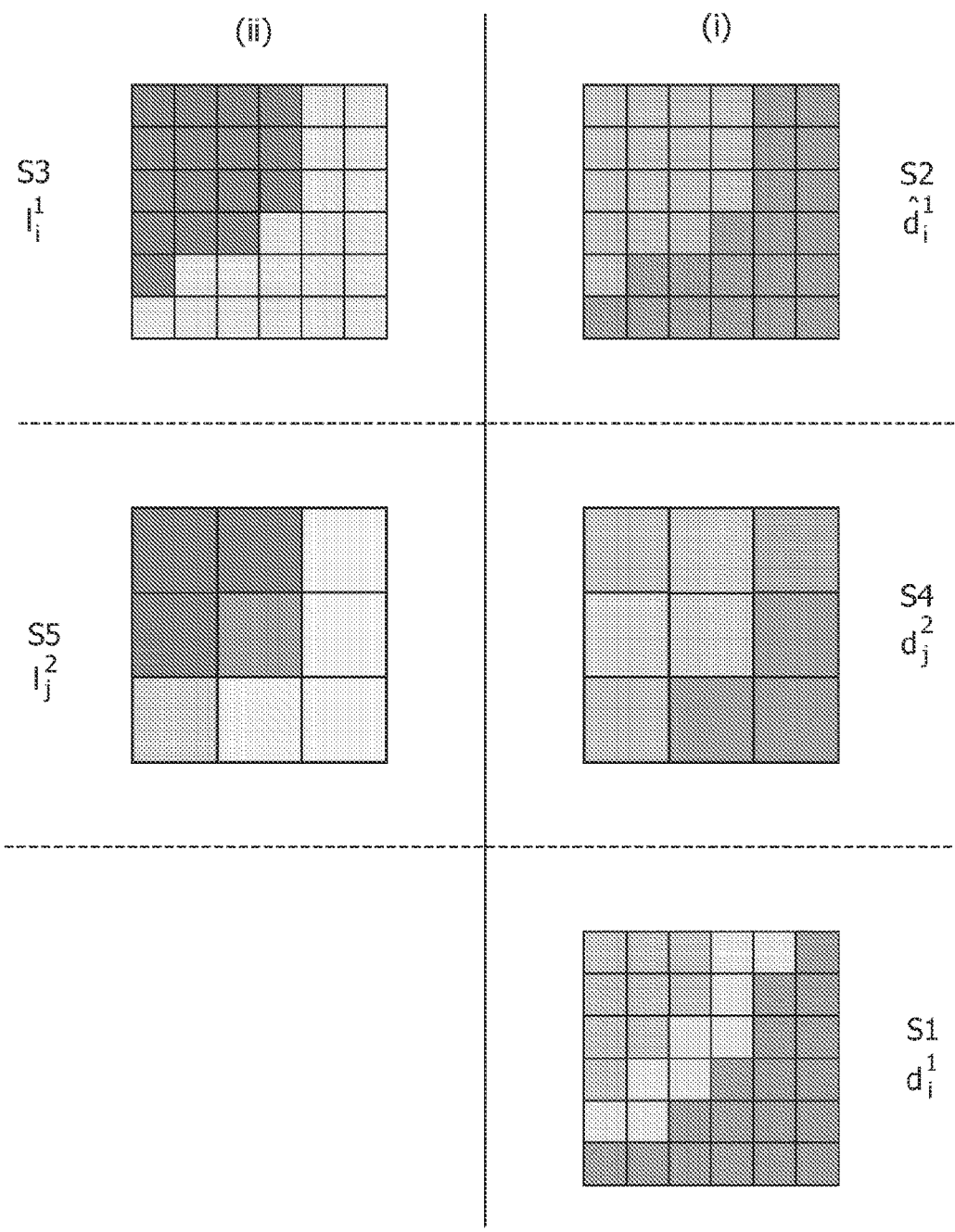
FIG. 2E schematically shows the five structures of samples of FIG. 2A, whereby the values of the second structure of samples have been computed.

FIG. 2E schematically shows the structures of samples of FIG. 2A, as well as the values of the second structure of samples that have been computed. In other words, FIG. 2E schematically shows the result of computations of the second samples of the second sample structure S2. FIG. 2E schematically shows that the values of second samples are based on the values of the fourth samples of the fourth structure S4 (grey values). The "shape" of the "object" in the second structure S2 corresponds to the "shape" of the "object" in the third structure S3; the depth values of the down-sampled input image are adapted to the luminance values of the corresponding image.

Optionally, an extra factor is applied to weight the various weight factors $w_{ij}$ whereby the extra factor is related to the reliability of the values of the first samples.

$$w_{ij}^r = r_j w_{ij} \quad (6)$$

Then the modified weight factors are used instead of the weight factors specified previously (see Equations 2-5). Such a reliability factor can for example be obtained from a motion estimator/depth estimator. The estimator can determine where de-occlusion areas are. Values in these areas are not as reliable, so should count with a lower weight. Alternatively, the reliability factor is directly based on luminance values of the input images of the estimator: motion vectors and depth values related to homogeneous image areas are to be trusted less. The reliability factor may also be derived from a depth signal: a decoder decoding a depth signal could indicate when high quantization was applied during encoding, in which case depth might also be less reliable.

Figure 2F:
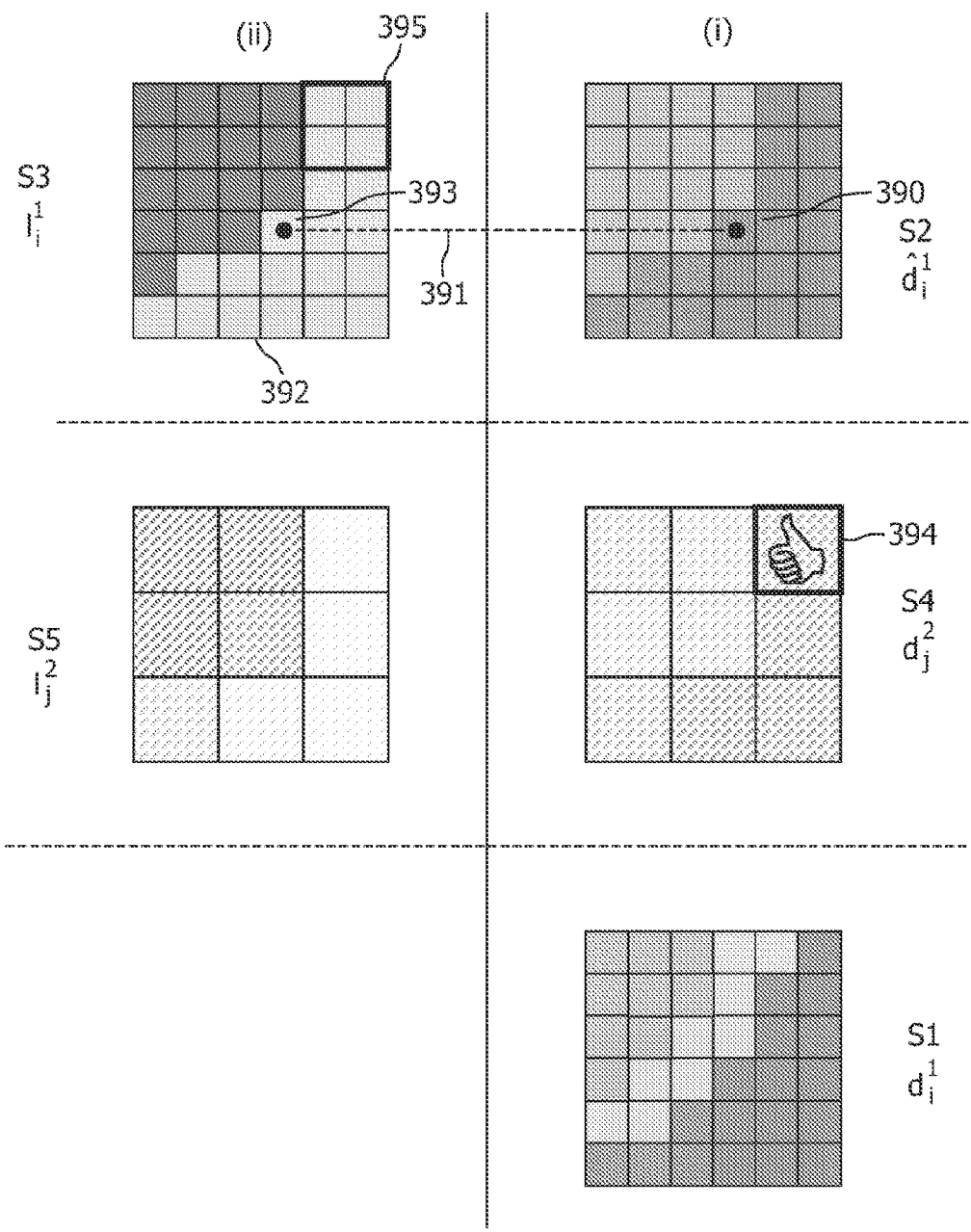
FIG. 2F schematically shows five structures of samples, two of which are required to compute the samples of the second structure of samples.

FIG. 2F shows five structures of samples. As can be observed from the FIGS. 2A-2E, all information used for calculating the second samples of the second structure S2 of samples is comprised in the first structure of samples S1 and the third structure of samples S3. In order to compute the samples of the second structure of samples, two intermediate structures of samples are computed; the fourth and the fifth structure of samples, here indicated using a dashed representation. It will be clear that even when the fourth and fifth structures are not explicitly generated and stored in a memory, the calculation and subsequent use of the samples according to the present invention is within the scope of the present invention.

Although in the previous examples, for the sake of clarity, a fifth structure S5 of samples was generated, all information comprised in the fifth structure S5 of samples is derived from the third structure S3 of samples. Strictly speaking the calculation of the fifth structure S5 of samples is not required, and weight factors for the fourth samples of the fourth structure of samples can be assigned based on the third structure of samples only.

For example, in order to establish a second sample 390 of the second structure of samples S2 we first establish a corresponding third sample 393 of the third structure S3 of samples, using the relationship indicated by the dashed line 391.

Subsequently the weight factors for respective samples of the fourth sample structure S4 are calculated. One way of doing so is to first establish how samples of the third structure S3 of samples relate to respective samples of the fourth sample structure S4. In this example a sample of the fourth structure S4 corresponds to four samples of the third structure S3 as indicated by the grid 392. The respective weight factor for a fourth sample 394 of the fourth sample structure S4, can be determined by correlating the third sample 393 with the samples of the third structure corresponding to the fourth sample 394 of the fourth structure S4 of samples.

In this case the four samples 395, corresponding to the fourth sample structure S4, are identical to the third sample 393. This clearly represents a high correlation and as a result a relatively high weight factor should be assigned to the fourth sample 394 indicated by the "thumbs up sign". Various manners can be envisaged to establish this correlation, one of which could be the determination of the fraction of samples from the samples 395 that are within a pre-determined threshold from the third sample 393.

In this manner the second sample 390 of the second structure S2 of samples can be computed without having to explicitly establish fifth samples corresponding to the fifth structure of samples.

Figure 3:
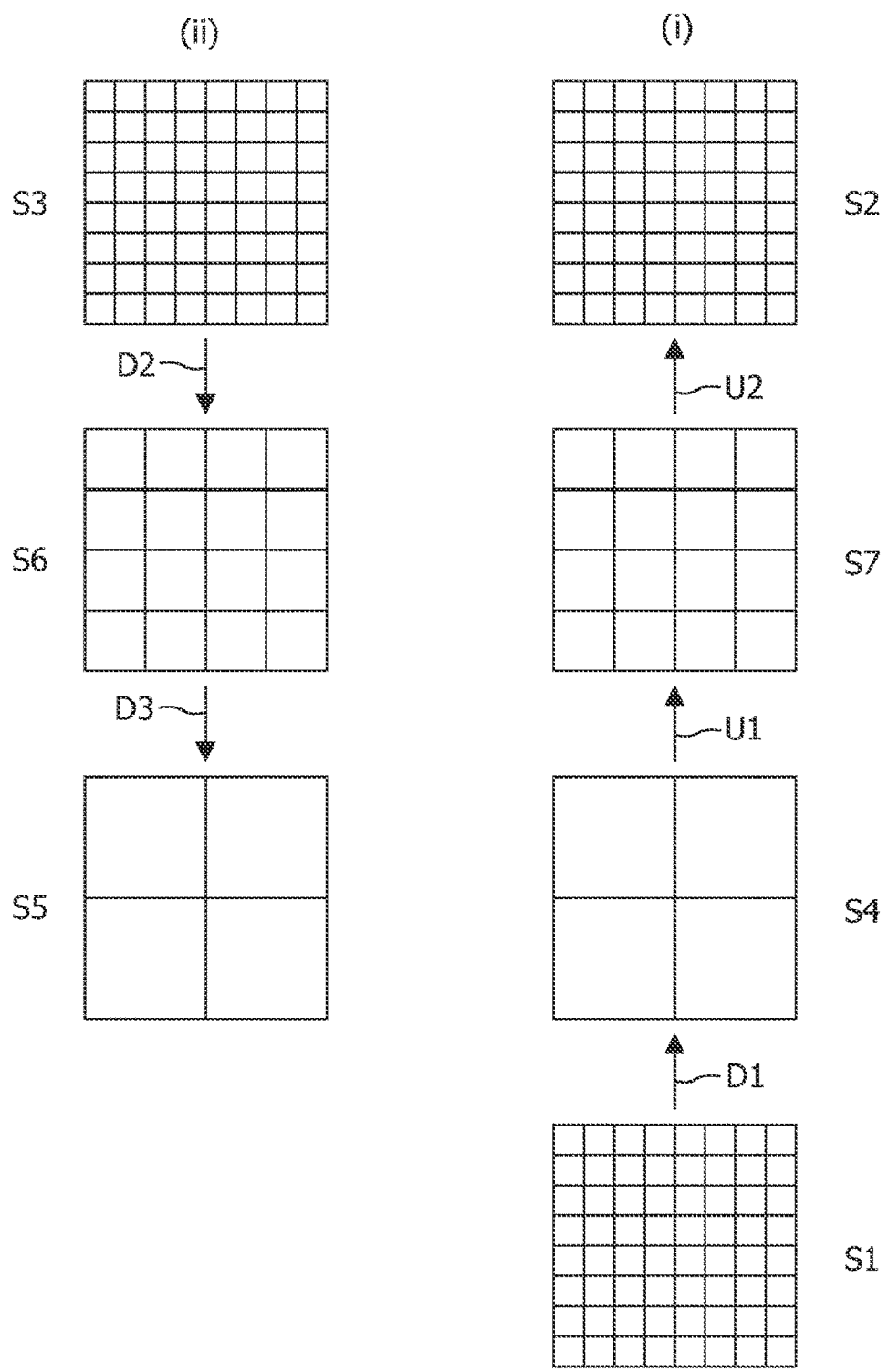
FIG. 3 schematically shows seven structures of samples.

FIG. 3 schematically shows seven structures of samples S1-S7. As explained in connection with FIGS. 3A-3F, the method according to the invention aims to enhance the first sample structure S1, by first down-scaling the first sample structure in order to obtain the fourth sample structure, and subsequently up-scaling the fourth structure S4 of samples into the second structure S2 of samples, based on a third structure S3 of samples and a fifth structure S5 of samples. Typically up-scaling the fourth sample structure S4 comprises multiple steps, one of which is first step U1. After the first up-scaling step U1 a second up-scaling step U2 may follow. Even more than two up-scaling steps may be performed (not depicted). The second up-scaling step U2 is similar to the first up-scaling step U1. Hence, the second up-scaling step U2 means up-scaling the seventh structure S7 of samples into the second structure S2 of samples based on the sixth structure S6 of samples and the third structure S3 of samples. The output of first up-scaling step U1, i.e. the seventh structure S7 of samples, is then used as input for the second up-scaling step U2.

Typically, the samples of the second property are available at a relatively high resolution at the beginning of the total scaling process. For instance there is an input image represented by a structure of samples S3, being a matrix of 1024× 1024 elements. By means of down-scaling, or optionally a cascade of down-scaling steps D2 and D3, a number of additional structures of samples, S6 and S5, are computed. These are required for the respective up-scaling steps U1 and U2 comprised in the method according to the invention. For instance, the third structure S3 of samples is down-scaled D2 by a factor of two into the sixth structure S6 of samples, being a matrix of 512×512 elements. Subsequently, the sixth structure S6 of samples is down-scaled D3 by a factor of two resulting in the fifth structure S5 of samples, being a matrix of 256×256 elements. Alternatively, the third structure S3 of samples is directly down-scaled by a factor of four resulting in the fifth structure S5 of samples.

It will be clear that the down-scaling steps are related to the up-scaling steps, since samples of different properties are required for the up-scaling of the corresponding resolutions. Although it is preferred to perform the up-scaling recursively, e.g. from 8×8 to 4×4 to 2×2 to 1×1, it is also possible to perform the up-scaling in one step, e.g. from 8×8 to 1×1. Here x×x refers to the number of high resolution samples corresponding to a respective low resolution sample.

The image adaptive up-scaling as applied in a method of image enhancement according to the invention is typically based on filtering a number of input samples, i.e. fourth samples of the fourth structure S4 of samples, to compute output samples, i.e. second samples of the second structure S2 of samples. As specified above, the input samples are weighted with respective weight factors, which are based on differences between samples related to the second property. The configuration of input samples that is taken into account for the computation of a particular output sample is called a filter aperture. The filter aperture determines which input samples are used in the computation of the particular output sample. FIG. 4A schematically shows a first filter aperture and FIG. 4B schematically shows a second filter aperture, the grayed pixels in the filter aperture contributing to the output pixel.

Since an error in the first up-scaling U1 (e.g. from 8×8 to 4×4) affects multiple output pixels, as well as the further up-scaling steps, it seems logical to spend more effort on attempting to avoid mistakes in this first step. Furthermore, this first step is executed on a coarse grid, so the amount of samples to be processed is relatively small. At each up-scaling step, the resolution, that is the number of samples involved, is increased. In case of an up-scaling factor of 2 (in both directions), the number of samples increases 4-fold. As a result it is advantageous to apply the more advanced methods for establishing the weight factors, such as using multiple color components, and/or using reliability factors at coarser resolutions only. Such more advanced methods improve the quality of the weight factors in that they restrict the influence that unreliable pixels may have on the weight factors. With these more advanced methods it is possible to use a wider filter aperture. As an example, we found that it is possible to use a radius of 6 (8×8) samples in 8 directions. This is illustrated by the shaded blocks in FIG. 4A. In contrast, FIG. 4B shows a simplified aperture suitable for finer resolutions in subsequent up-scaling steps.

FIG. 5A presents a further embodiment in the form of an image enhancement unit 610 according to the present invention that is used to enhance an estimate of a depth map for one image in a sequence of images. In the previous embodiments a method according to the invention was used to enhance a first structure S1 of samples representing an estimate of a first property using a third structure S3 of samples representing a second property. The embodiment shown in FIG. 5A is different in that it involves a temporal aspect.

The image enhancement unit 610 shown in FIG. 5A uses a first structure S1(t1) of samples representative of the first property at a first timestamp, as an estimate of a further first structure of the first property at a second timestamp. The present invention can subsequently be used to enhance this estimate based on a third structure S3(t2) of samples representing the second property at timestamp t2.

The embodiment shown in FIG. 5A uses a first depth map S1(t1) associated with a scene at timestamp t1, as an estimate of a second depth map associated with the scene at timestamp t2. The rationale for using the first depth map S1(t1) as an estimate for the second depth map is that in adjacent images of a sequence there is typically a strong correlation between the corresponding depth maps. However, as a result of e.g. changes in the scene, and/or changes in the manner in which the scene was imaged (e.g. pan and/or zoom), the depth map at the first timestamp t1 is generally not identical to, but only provides an estimate of the depth map at the second timestamp t2. Provided that the first-timestamp and the second-timestamp are sufficiently proximate in time, e.g. in case the time stamps relate to adjacent frames, or are within a pre-determined threshold of each other, the first depth map S1(t1) can typically be used as an estimate of the depth map at the second timestamp t2.

The present invention can be used to enhance the first depth map S1(t1) at the first timestamp t1 in accordance with the present invention using a color map S3(t2) at the second timestamp t2 to produce an enhanced depth map that can be used as the depth map $\hat{S}1(t2)$ for rendering the scene at timestamp t2. The first depth map S1(t1) at the first timestamp t1 is first down-scaled 620 resulting in a fourth structure S4(t1) of samples at the first timestamp t1. The fourth structure S4(t1) of samples at the first timestamp t1 is then up-scaled 630 resulting in the second structure S2(t2) of samples at the second timestamp t2 based on the third structure S3(t2) of samples at the second timestamp t2. Optionally, in order to further improve the quality of the enhanced depth map it is possible to combine 640 the second structure S2(t2) with a further estimate Sn(t2) of the depth map at the second timestamp t2 resulting in a final estimate $\hat{S}1(t2)$ of the depth map at the second timestamp t2.

The above embodiment illustrates how the present invention can be used to enhance a temporal estimate of a depth map. The present invention can also be applied advantageously for enhancing a disparity map or motion-vector fields. It should further be noted that the present invention can be applied when the timestamp t1 precedes t2, but can also be used when timestamp t2 precedes t1.

Figure 5B:
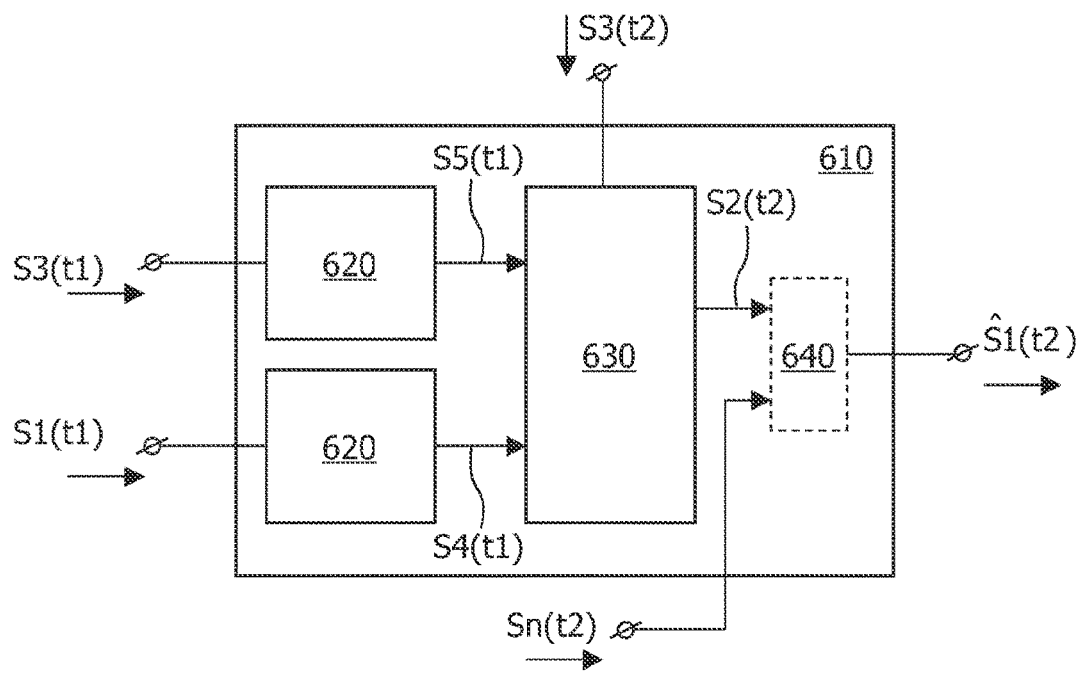
FIG. 5B schematically shows an embodiment of the present invention for enhancing a depth map.

FIG. 5B schematically shows a more advantageous image enhancement unit 610 that not only uses the third structure S3(t2) of samples at the second timestamp t2, but also uses a fifth structure S5(t1) of samples at the first timestamp t1 to upscale 630 the fourth structure S4(t1) at the first timestamp t1. The fifth structure S5(t1) at the first timestamp t1 here is used instead of a fifth structure S5(t2) at the second timestamp t2 that can be derived from the third structure S3(t2) at the second timestamp t2. The ratio behind using the fifth structure S5(t1) at the first timestamp t1 is that the samples from the fourth and the fifth structure now both relate to the same timestamp t1. Subsequently, when the differences between the third structure S3(t2) at the second timestamp t2 and the fifth structure S5(t1) at the first timestamp t1 are determined, this difference provides a more accurate weight factor for weighting the fourth structure S4(t1) at the first timestamp t1, resulting in an enhancement that is improved on average.

Although the embodiment depicted in FIG. 5B shows an image enhancement unit 610 with an input for the third structure of samples S3(t1) at timestamp t1 followed by a down-scaling unit 620, this is not mandatory. Optionally, an alternative image enhancement unit 610 can be envisaged with an input for the fifth structure S5(t1) at timestamp t1.

In a particularly advantageous embodiment the final estimate $\hat{S}1(t2)$ of the depth map at the second timestamp t2 is generated using:
 a first structure S1(t2) at the first time stamp t1 that is enhanced resulting in a second structure S2(t2) at the second timestamp t2 (see FIG. 5B) and
 a further structure Sn(t2) representative of the first property at the second timestamp t2 based on the third structure of samples at the second timestamp t2.

In an example of the above embodiment the first property is depth and the second property is luminance. The further structure Sn(t2) represents a depth map that may be generated by enhancing an estimate of the depth map at timestamp t2 using a method according to the present invention as described in conjunction with the FIGS. 2A-2F. The estimate in turn may be generated e.g. by application of the method of depth map generation according to e.g. WO2005/013623.

Figure 6A:
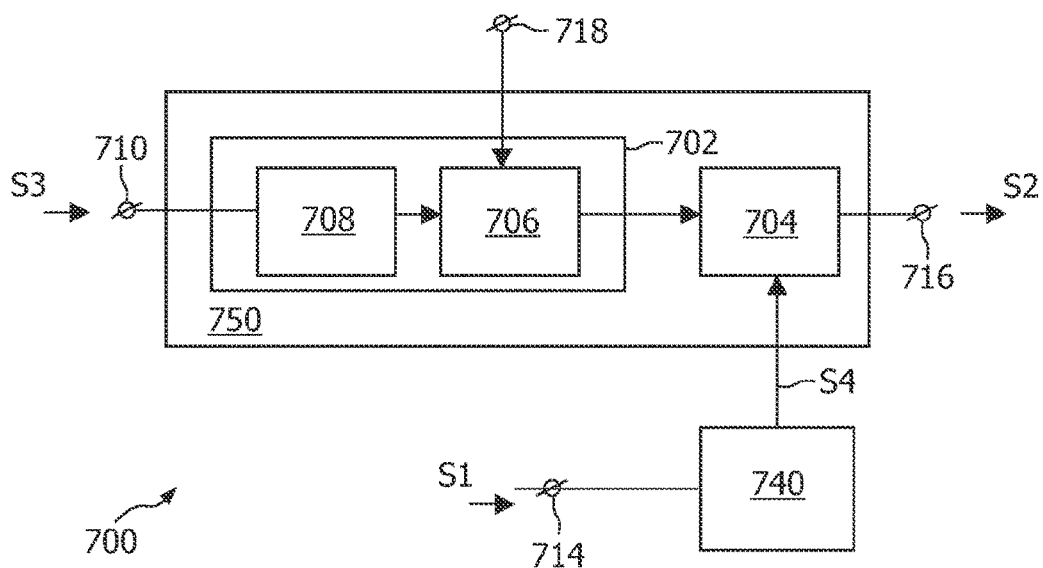
FIG. 6A schematically shows an image enhancement unit according to the invention.

The structures S2(t2) and Sn(t2) are combined 640, e.g. by blending the two structures, to form the final estimate S1(t2) of the depth map at the second timestamp t2. By combining temporally propagated depth map information from the first timestamp t1 with a newly estimated depth map for the second timestamp t2, error propagation of faulty depth map information is limited and temporal consistency of the resulting depth map is improved. Consequently, this embodiment is particularly advantageous for generating depth maps for video sequences. FIG. 6A schematically shows an image enhancement unit 700 according to the invention. The image-enhancement unit 700 is arranged to enhance a first structure S1 of samples representing a first property, the first structure S1 having a first resolution, into a second structure S2 of samples representing the first property, the second structure S2 having a second resolution, based on a third structure S3 of samples representing a second property.

The image enhancement unit 700 comprises a first input connector 714 for receiving the first samples of the first structure of samples S1, a second input connector 710 for receiving the third samples of the third structure of samples S3, and a first output connector 716 for providing the second samples of the second structure of samples S2.

The image enhancement unit 700 comprises:
- a generating unit 740 arranged to generate fourth samples of a fourth structure S4 of samples representing the first property, the fourth structure S4 having a second resolution lower than the first resolution, by down-scaling first samples of the first structure S1 of samples to form the fourth samples of the fourth structure S4 of samples; and
- an up-scaling unit 750 arranged to up-scale the fourth structure S4 of samples representing the first property, into the second structure S2 based on the third structure S3 of samples, the up-scaling unit 750 comprising:
  - a weight factor assigning unit 702 arranged to assign weight factors to respective fourth samples of the fourth structure S4 of samples based on third samples of the third structure S3 of samples; and
  - a first computing unit 704 arranged to compute the second samples of the second structure S2 of samples based on the fourth samples of the fourth structure S4 of samples and the respective weight factors.

Preferably, the weight factor assigning unit 702 comprises a second computing unit 708 arranged to calculate differences between third samples of the third structure S3 of samples and low-pass filtered third samples of the third structure S3 of samples. More preferably, the low-pass filtering comprises generating a fifth structure S5 of samples by down-scaling the third structure S3 of samples.

Preferably, the weight factor assigning unit 702 further comprises a mapping unit 706 for mapping the differences being computed by the second computing unit 708 to respective weight factors. Even more preferably, the mapping unit 706 is arranged to perform a non-linear function for mapping an input value, i.e. difference, into an output value, i.e. weight factor. Preferably, the non-linear function is an exponential function, which transforms a relatively large difference to a relatively small weight factor. Preferably, the mapping unit 706 is implemented by means of a LUT (look up table).

Optionally, the image enhancement unit 700 comprises a fourth input connector 718 for receiving reliability values as described in connection with Equation 6.

The generating unit 740 and the up-scaling unit 750 may be implemented using one processor. Normally, these functions are performed under the control of a software program product. During execution, normally the software program product is loaded into a memory, like a RAM, and executed from there. The program may be loaded from a background memory, such as a ROM, hard disk, or magnetical and/or optical storage, or may be loaded via a network like the Internet. Optionally, an application specific integrated circuit provides the disclosed functionality.

Figure 6B:
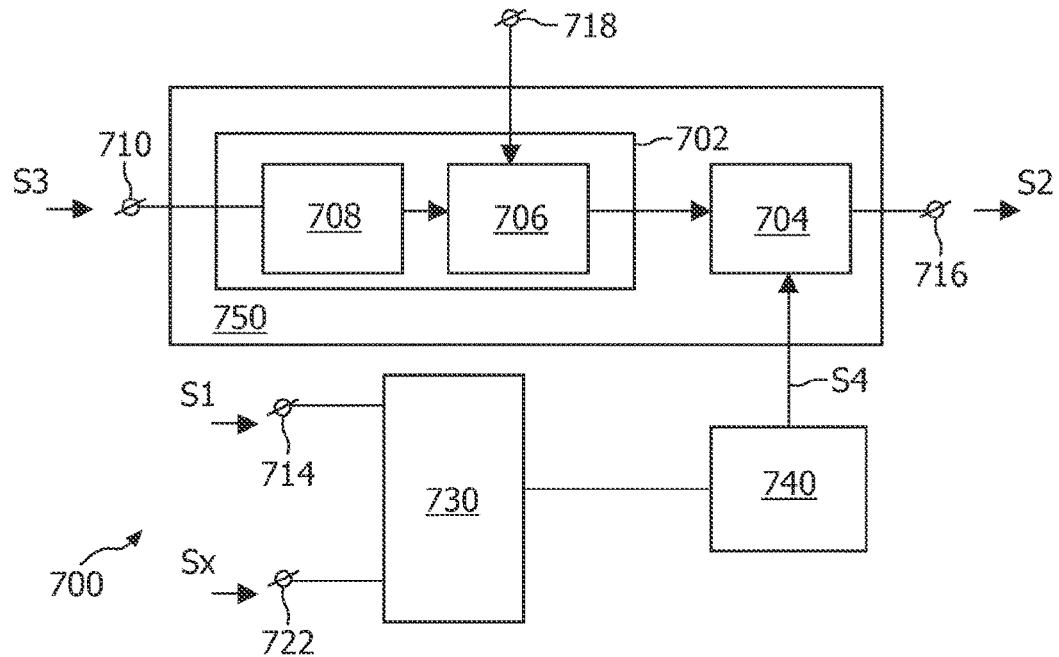
FIG. 6B schematically shows an image enhancement unit according to the invention.

FIG. 6B shows a further image enhancement unit 700 according to the present invention fitted with a further input connector 722 for receiving a further structure Sx of samples representing a further structure representative of the first property having the first resolution. The first structure S1 and the further structure Sx are subsequently combined 730, e.g. by weighted addition, into a single structure of samples before further processing. In this manner multiple depth map estimates may be advantageously combined.

Figure 7:
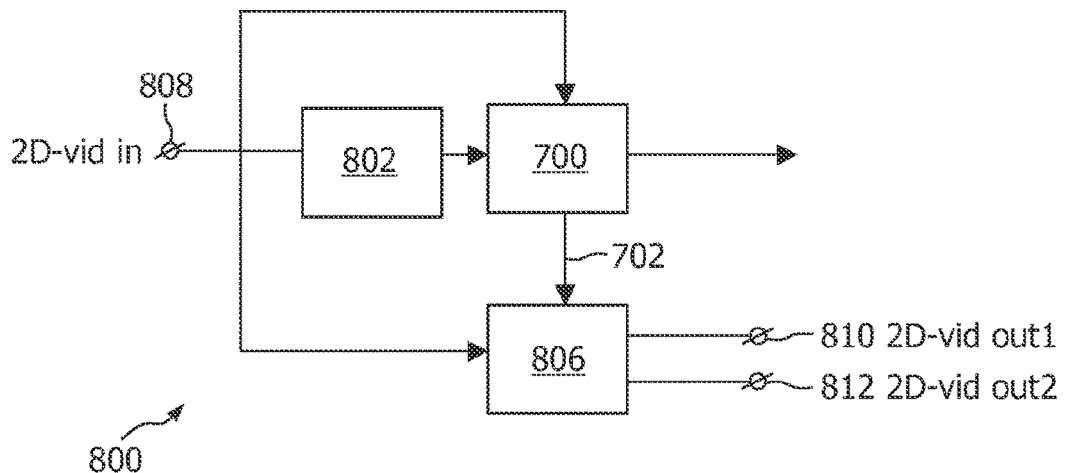
FIG. 7 schematically shows a multi-view image generation unit.

FIG. 7 schematically shows a multi-view image generation unit 800 comprising:

- a depth map generation unit 802 for generating depth maps for the respective input images based on the images. The depth maps comprise depth values representing distances to a viewer and wherein the resolution of the depth maps is equal to the resolution of the input images;
- an image enhancement unit 700 as described in connection with FIG. 6A for enhancing the depth maps into enhanced depth maps, based on the input images. The resolution of the enhanced depth maps corresponding to the resolution of the input images; and
- a rendering unit 806 for rendering multi-view images based on the input images and the respective improved depth maps, which are provided by the image enhancement unit 800.

The multi-view image generation unit 800 is arranged to generate a sequence of multi-view images based on a sequence of video images. The multi-view image generation unit 800 is provided with a stream of video images at the input connector 808 and provides two correlated streams of video images at the output connectors 810 and 812, respectively. These two correlated streams of video images are to be applied to a multi-view display device which is arranged to visualize a first series of views based on the first one of the correlated streams of video images and to visualize a second series of views based on the second one of the correlated streams of video images. If a user, i.e. viewer, observes the first series of views using his left eye and the second series of views using his right eye simultaneously (s)he can perceive a 3D impression. It might be that the first one of the correlated streams of video images corresponds to the sequence of video images as received and that the second one of the correlated streams of video images is rendered based on the sequence of video images as received. Preferably, both streams of video images are rendered based on the sequence of video images as received. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. In a further embodiment the rendering is as described in "High-quality images from 2.5D video", by R. P. Berretty and F. E. Ernst, in Proceedings Eurographics, Granada, 2003, Short Note 124.

Figure 8:
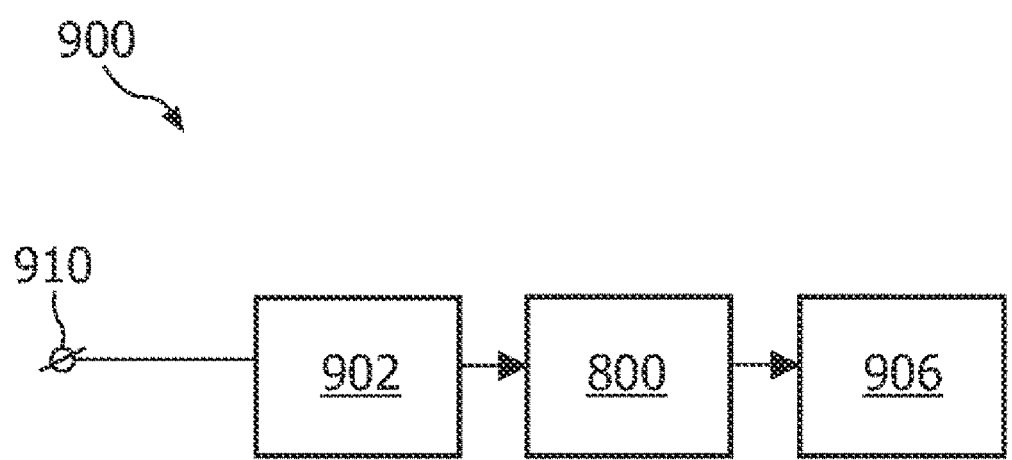
FIG. 8 schematically shows an image-processing apparatus according to the invention.

FIG. 8 schematically shows an embodiment of the image-processing apparatus 900 according to the invention, comprising:
- receiving means 902 for receiving a signal representing input images;
- a multi-view image generation unit 800 as described in connection with FIG. 7; and
- a display device 906 for displaying the output images of the multi-view image generation unit 800.

The signal may be a broadcast signal received via an antenna or cable but may also be a signal from a storage device such as a VCR (Video Cassette Recorder) or DVD (Digital Versatile Disk). The signal is provided at the input connector 910. The image-processing apparatus 900 might e.g. be a TV. Alternatively, the image-processing apparatus 900 does not comprise the optional display device but applies the output images to an apparatus that does comprise a display device 906. Then the image-processing apparatus 900 might be e.g. a set top box, a satellite-tuner, a VCR player, a DVD player or recorder. Optionally, the image-processing apparatus 900 comprises storage means, such as a hard disk or means for storage on removable media, e.g. optical disks. The image-processing apparatus 900 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware or software. The use of the words first, second and third, etcetera does not indicate any ordering. These words are to be interpreted as names. No specific sequence of acts is intended to be required unless specifically indicated.

The invention claimed is:

1. Method of enhancing a first structure (S1) of samples into a second structure (S2) of samples, the first and the second structure both representing a first property of a scene and having a first resolution, based on a third structure (S3) of samples representing a second property and having the first resolution, the first property and the second property respectively representing different properties of substantially the same scene, the method comprising:
    generating (620) a fourth structure (S4) of samples representing the first property, the fourth structure (S4) of samples having a second resolution lower than the first resolution, by down-scaling first samples of the first structure (S1) of samples to form the samples of the fourth structure (S4) of samples;
    up-scaling (630) the fourth structure (S4) of samples representing the first property, into the second structure (S2) of samples based on the third structure (S3) of samples, the up-scaling (630) comprising:
        i) assigning weight factors (702) to respective samples of the fourth structure (S4) of samples based on samples of the third structure (S3) of samples; and
        ii) computing (704) samples of the second structure (S2) of samples using the samples of the fourth structure (S4) of samples and their respectively assigned weight factors.

2. Method of claim 1, wherein the weight factors assigned to respective samples of the fourth structure (S4) of samples are based on differences between:
    third samples of the third structure (S3) of samples; and
    low-pass filtered third samples of the third structure (S3) of samples.

3. Method of claim 2, wherein assigning weight factors to the respective samples of the fourth structure (S4) of samples further comprises:
    generating a fifth structure (S5) of samples representing the second property, the fifth structure (S5) having the second resolution, by down-scaling (620) the samples of the third structure (S3) of samples to form the samples of the fifth structure (S5) of samples and wherein
    the weight factors assigned to the respective samples of the fourth structure (S4) of samples are based on differences between samples of the fifth structure (S5) of samples and the samples of the third structure (S3) of samples.

4. Method of claim 1, wherein the weight factors are determined based on a non-linear function of the differences.

5. Method of claim 1, wherein the non-linear function is an exponential function.

6. Method of claim 4, wherein the function transforms a relatively large difference into a relatively small weight factor.

7. Method of claim 2, wherein
    assigning a first one of the weight factors of a first one of the samples (306) of the fourth structure (S4), to be used for computing a first one of the samples (300) of the second structure (S2), is based on a first difference between a first one of the samples (302) of the third structure (S3) and a first one of the samples (304) of the fifth structure (S5), the respective coordinates of the first one of the samples (300) of the second structure (S2) and the first one of the samples (302) of the third structure (S3) being mutually equal.

8. Method of claim 2, wherein
    assigning a first one of the weight factors of a first one of the samples (306) of the fourth structure (S4), to be used for computing a first one of the samples (300) of the second structure (S2), is based on a first difference between a first one of the samples (302) of the third structure (S3) and a firs one of the samples (304) of the fifth structure (S5), the respective coordinates of the first one of the samples (304) of the fifth structure (S5) and the first one of the samples (306) of the fourth structure being mutually equal.

9. Method of claim 1, wherein the up-scaling (630) comprises multiple scaling steps comprising:
    a scaling step (U1) to obtain an intermediate structure of samples representing the first property, the intermediate structure of samples having an intermediate resolution, which is higher than the second resolution and lower than the first resolution; and
    a further scaling step (U2) to obtain the second structure of samples based on the intermediate structure of samples.

10. Method of claim 1, wherein the first property is one of:
    depth;
    disparity; and
    motion.

11. Method of claim 1, wherein the second property is one of:
    color;
    luminance; and
    color texture.

12. Method of claim 1, wherein generating (620) a sample from the fourth structure (S4) of samples comprises combining multiple samples from the first structure (S1) of samples.

13. Method of claim 1, wherein down-scaling comprises use of a box filter.

14. Method of claim 1, wherein:
    the first structure of samples (S1(t1)) represents the first property of the scene at a first timestamp (t1);
    the third structure (S3(t2)) of samples represents the second property of the scene at a second timestamp (t2); and
    the second timestamp (t2) is proximate in time to the first timestamp (t1), such that the first structure (S1(t1)) of samples at the first timestamp (t1) forms an estimate of the second structure of samples (S2(t2)) representing the first property at the second timestamp (t2).

15. Method of claim 14, wherein assigning weight factors to the respective samples of the fourth structure (S4(t1)) of samples at the first timestamp (t1) further comprises:
    generating a fifth structure (S5(t1)) of samples representing the second property at the first timestamp (t1), the fifth structure (S5(t1)) of samples at the first timestamp (t1) having the second resolution, by down-scaling samples of a third structure (S3(t1)) of samples at the first timestamp (t1) to form the samples of the fifth structure (S5(t1)) of samples at he first timestamp (t1), and wherein the weight factors assigned to the respective samples of the fourth structure (S4(t1)) of samples at timestamp (t1) are based on differences between samples of the fifth structure (S5(t1)) of samples at the first timestamp (t1) and the samples of the third structure (S3(t2)) of samples at the second timestamp (t2).

16. Image enhancement unit (700) for enhancing a first structure (S1) of samples into a second structure (S2) of samples, the first and the second structure both representing a first property of a scene and having a first resolution, based on a third structure (S3) of samples representing a second property having the first resolution, the first property and the second property respectively representing different properties of substantially the same scene, the enhancement-unit (700) comprising:

a generating unit (740) arranged to generate samples of a fourth structure (S4) of samples representing the first property, the fourth structure (S4) having a second resolution lower than the first resolution, by down-scaling first samples of the first structure (S1) of samples to form the samples of the fourth structure (S4) of samples;

an up-scaling unit (750) arranged to up-scale the fourth structure (S4) of samples representing the first property, into the second structure (S2) based on the third structure (S3) of samples, the up-scaling unit (750) comprising:

weight factor assignment unit (702) arranged to assign weight factors to respective samples of the fourth structure (S4) of samples based on samples of the third structure (S3) of samples; and a first computing unit (704) arranged to compute samples of the second structure (S2) of samples using the samples of the fourth structure (S4) of samples and their respectively assigned weight factors.

17. Image-processing apparatus comprising the image enhancement unit of claim 16.

18. Video display apparatus comprising the image enhancement unit of claim 16.

19. A computer program code means stored on a non-transitory computer readable medium to be loaded by a computer arrangement, said program code means arranged to execute the steps of the method claim 1 when said program code means is run on a computer.

* * * * *